United States Patent
Northcott et al.

(10) Patent No.: US 10,860,142 B1
(45) Date of Patent: Dec. 8, 2020

(54) LIGHT-BASED DEVICES WITH LIGHT GUIDE ARRAYS

(71) Applicant: Apple Inc., Cupertino, CA (US)

(72) Inventors: Malcolm J. Northcott, Santa Cruz, CA (US); Daniel E. Potter, San Jose, CA (US); Clarisse Mazuir, San Jose, CA (US); Weisong Toh, San Mateo, CA (US); Piyush Prashant Dondeti, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 15/248,405

(22) Filed: Aug. 26, 2016

Related U.S. Application Data

(60) Provisional application No. 62/210,811, filed on Aug. 27, 2015.

(51) Int. Cl.
   *G06F 3/042* (2006.01)
   *F21V 8/00* (2006.01)
   *G02B 6/04* (2006.01)

(52) U.S. Cl.
   CPC ......... *G06F 3/0421* (2013.01); *G02B 6/0008* (2013.01); *G02B 6/04* (2013.01)

(58) Field of Classification Search
   None
   See application file for complete search history.

(56) References Cited

U.S. PATENT DOCUMENTS

| | | |
|---|---|---|
| 3,278,738 A | 10/1966 | Clark |
| 4,349,817 A | 9/1982 | Hoffman et al. |
| 4,534,813 A | 8/1985 | Williamson et al. |
| 5,329,386 A | 7/1994 | Birecki et al. |
| 5,502,457 A | 3/1996 | Sakai et al. |
| 5,526,458 A | 6/1996 | Hochgraf |
| 5,659,378 A | 8/1997 | Gessel |
| 6,046,730 A | 4/2000 | Bowen et al. |
| 6,326,939 B1 | 12/2001 | Smith |
| 6,407,785 B1 | 6/2002 | Yamazaki |
| 6,467,922 B1 | 10/2002 | Blanc et al. |
| 6,680,761 B1 | 1/2004 | Greene et al. |
| 6,845,190 B1 | 1/2005 | Smithwick et al. |
| 7,228,051 B2 | 6/2007 | Cok et al. |
| 7,270,458 B2 | 9/2007 | Kuo et al. |
| 7,542,209 B2 | 6/2009 | McGuire, Jr. |
| 7,823,309 B2 | 11/2010 | Albenda |

(Continued)

*Primary Examiner* — Amare Mengistu
*Assistant Examiner* — Sarvesh J Nadkarni
(74) *Attorney, Agent, or Firm* — Treyz Law Group, P.C.; G. Victor Treyz; Kendall W. Abbasi

(57) ABSTRACT

A light-based device may provide images and other light output to a user and may gather user input. The device may include a light guide array formed from a bundle of fibers. The light guide array may have an entrance surface that receives light emitted by a light-emitting device. The light-emitting device may include one or more light-emitting diodes and may be a display having an array of pixels. Light from the light-emitting device may be conveyed from the entrance surface to the exit surface by the light guide array. The exit surface of the light guide array may have a compound curvature. Optical structures may be formed over the exit surface. The light-based device may form light-field display, may form a touch sensor, may form a controller, and may form other structures.

19 Claims, 19 Drawing Sheets

(56) References Cited

U.S. PATENT DOCUMENTS

| | | |
|---|---|---|
| 7,856,161 B2 | 12/2010 | Tabor |
| 8,045,270 B2 | 10/2011 | Shin et al. |
| 8,723,824 B2 | 5/2014 | Myers et al. |
| 8,824,779 B1 | 9/2014 | Smyth |
| 8,976,324 B2 | 3/2015 | Yang et al. |
| 9,268,068 B2 | 2/2016 | Lee |
| 9,312,517 B2 | 4/2016 | Drzaic et al. |
| 9,342,105 B2 | 5/2016 | Choi et al. |
| 9,509,939 B2 | 11/2016 | Henion et al. |
| 9,591,765 B2 | 3/2017 | Kim et al. |
| 9,755,004 B2 | 9/2017 | Shieh et al. |
| 9,818,725 B2 | 11/2017 | Bower et al. |
| 9,907,193 B2 | 2/2018 | Lee et al. |
| 10,052,831 B2 | 8/2018 | Welker et al. |
| 2002/0003711 A1* | 1/2002 | Hashimoto ............ G02B 6/0028 362/551 |
| 2003/0012532 A1* | 1/2003 | Prigent ............... G02F 1/133524 385/120 |
| 2004/0022506 A1* | 2/2004 | Arkas ...................... G02B 6/08 385/120 |
| 2006/0016448 A1 | 1/2006 | Ho |
| 2006/0119951 A1 | 6/2006 | McGuire, Jr. |
| 2007/0097108 A1 | 5/2007 | Brewer |
| 2007/0103924 A1* | 5/2007 | Lath .................... G01V 8/10 362/551 |
| 2008/0135206 A1* | 6/2008 | Alves ................. B60H 1/0065 165/42 |
| 2008/0144174 A1* | 6/2008 | Lucente ............... H04N 13/307 359/463 |
| 2008/0186252 A1 | 8/2008 | Li |
| 2008/0232751 A1* | 9/2008 | Tabor ..................... G02B 6/08 385/116 |
| 2009/0085831 A1* | 4/2009 | Odoi .................. G02F 1/133524 345/1.3 |
| 2010/0177261 A1 | 7/2010 | Jin et al. |
| 2010/0238090 A1 | 9/2010 | Pomerantz et al. |
| 2011/0025594 A1 | 2/2011 | Watanabe |
| 2011/0057861 A1 | 3/2011 | Cok et al. |
| 2011/0102300 A1 | 5/2011 | Wood et al. |
| 2011/0242686 A1 | 10/2011 | Watanabe |
| 2012/0218219 A1 | 8/2012 | Rappoport et al. |
| 2012/0239207 A1* | 9/2012 | Fadell ..................... F24F 11/30 700/276 |
| 2012/0287663 A1* | 11/2012 | Lathrop ................. B60K 35/00 362/558 |
| 2013/0081756 A1 | 4/2013 | Franklin et al. |
| 2013/0083080 A1 | 4/2013 | Rappoport et al. |
| 2013/0127790 A1* | 5/2013 | Wassvik ................. G06F 3/042 345/175 |
| 2013/0235560 A1 | 9/2013 | Etienne et al. |
| 2013/0279088 A1 | 10/2013 | Raff et al. |
| 2014/0016071 A1* | 1/2014 | Yang .................. G02F 1/133524 349/106 |
| 2014/0037257 A1 | 2/2014 | Yang et al. |
| 2014/0092028 A1 | 4/2014 | Prest et al. |
| 2014/0092346 A1 | 4/2014 | Yang et al. |
| 2014/0183473 A1 | 7/2014 | Lee et al. |
| 2014/0240985 A1 | 8/2014 | Kim et al. |
| 2014/0328041 A1 | 11/2014 | Rothkopf et al. |
| 2014/0354920 A1 | 12/2014 | Jang et al. |
| 2015/0093087 A1 | 4/2015 | Wu |
| 2015/0163945 A1* | 6/2015 | Barton .................... G08B 5/36 361/809 |
| 2015/0227227 A1 | 8/2015 | Myers et al. |
| 2016/0231784 A1 | 8/2016 | Yu et al. |
| 2016/0234362 A1 | 8/2016 | Moon et al. |
| 2017/0235341 A1 | 8/2017 | Huitema et al. |

\* cited by examiner

LIGHT-BASED DEVICES WITH LIGHT GUIDE ARRAYS

This application claims the benefit of provisional patent application No. 62/210,811, filed Aug. 27, 2015, which is hereby incorporated by reference herein in its entirety.

BACKGROUND

This relates generally to electronic systems and, more particularly, to systems that include light-based devices.

Displays and other devices that emit light may be used to provide visual information to a user. Displays may have planar surfaces containing arrays of pixels. The pixels of a display can be used to display images. Some displays include integrated touch sensors to allow a user to supply touch input.

It can be challenging to use displays in certain operating environments. If care is not taken, a display may not fit within a desired system or may not operate as intended.

It would therefore be desirable to be able to provide improved systems with displays.

SUMMARY

A light-based device may be used in an electrical system to provide images and other light-based output to a user. If desired, the light-based device may include a sensor for gathering user input. For example, a capacitive touch sensor that overlaps the surface of a light-based device may be used to gather touch input from a user.

Light-based devices may be provided that include light guide arrays. A light guide array for a light-based device may be formed from a bundle of fibers. The fibers may be plastic fibers or other transparent fibers that are surrounded by a low index cladding material.

The light guide array may have an entrance surface that receives light emitted by a light-emitting device. The light guide array may also have a corresponding exit surface. The exit surface of the light guide array may have a compound curvature. Light from the light-emitting device may be conveyed from the entrance surface to the exit surface by the light guide array. The light-emitting device may include one or more light-emitting diodes. If desired, the light-emitting device may be a display that has an array of pixels.

Optical structures may be formed over the exit surface. The optical structures may be configured to form a light-field display that displays three-dimensional images, to direct light towards one viewer and away from another viewer, or to adjust the apparent location of a displayed image.

Light sources and detectors may convey light to a user's finger on the exit surface and may measure reflected light from the user's finger to determine the location of the user's finger. In some configurations, the light guide array may have non-planar features such as recesses and protrusions to provide tactile feedback as a user moves a finger across the exit surface.

Light-based devices may be configured to form knobs and other controllers, may be configured to cover gaps associated with seams between structures that move with respect to each other, may be tiled to form a unified display with an enlarged image area, or may be used in forming other systems.

Further features of the invention, its nature and various advantages will be more apparent from the accompanying drawings and the following detailed description.

DETAILED DESCRIPTION

Light-based devices may be used to display images and provide other light-based output. Light-based devices may include light-emitting devices such as displays and light guide arrays. The light-based devices may be used in displaying light-based output such as images. The light-based devices may be used in systems such as office equipment systems, building systems, vehicle systems (e.g., dashboard systems for providing a user such as a vehicle occupant with vehicle information and for gathering user input), systems built into furniture, portable electronic devices (e.g., handheld devices, glasses, and other portable and miniature devices), or other electronic equipment.

Figure 1:
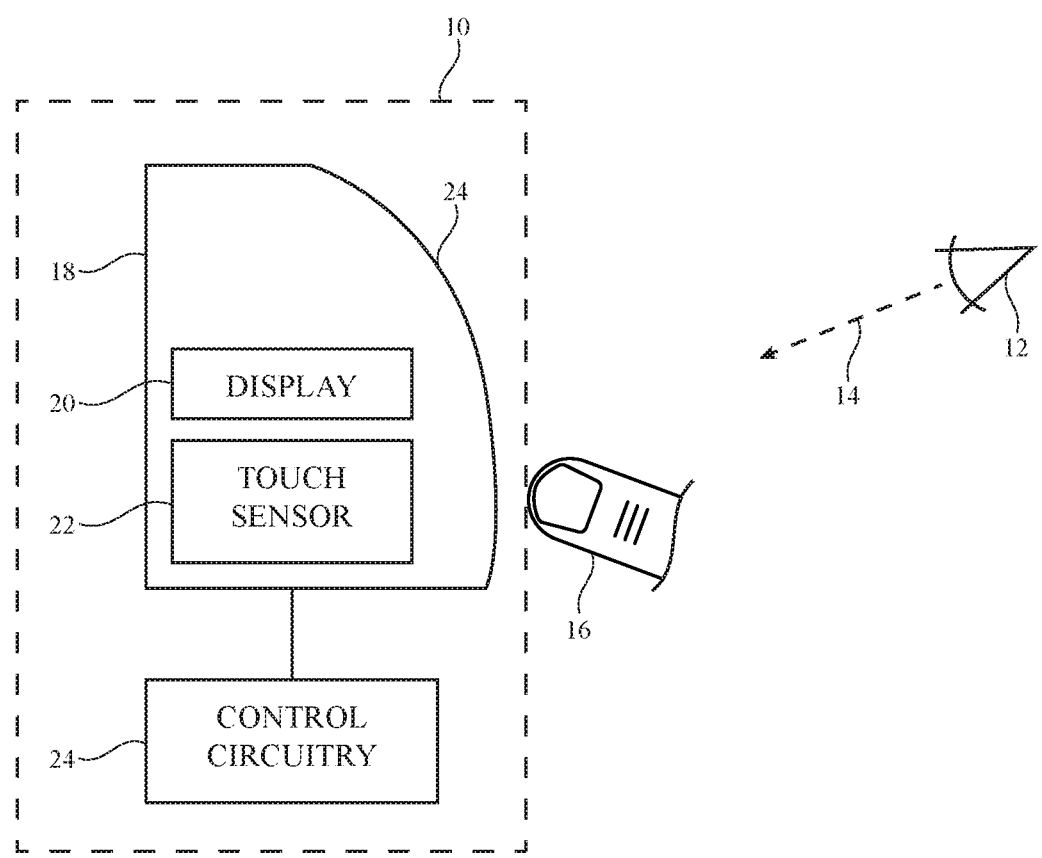
FIG. 1 is a diagram of an illustrative system with a light-based device in accordance with an embodiment.

An illustrative system that includes a light-based device is shown in FIG. 1. As shown in FIG. 1, system 10 may include one or more light-based devices such as light-based device 18. Light-based device 18 may include light-emitting components such as light-emitting diodes, lamps, etc. As an example, light-based device 18 may include one or more light-emitting devices such as display 20. Displays such as display 20 may be liquid crystal displays, organic light-emitting diode displays, displays based on array of micro-light-emitting diodes (e.g., crystalline semiconductor dies), electrophoretic displays, plasma displays, transreflective liquid crystal displays, organic liquid crystal displays, projectors, electrowetting displays, microelectromechanical systems (MEMs) displays, electrokinetic displays, electrofluidic displays, cholesteric liquid crystal displays, or other types of display.

A light guide array such as a coherent light guide array based on a bundle of transparent glass or plastic fibers or other parallel elongated light guide elements (sometimes referred to as waveguides or light guides) may have a surface such as surface 24. Surface 24 may have planar portions and/or curved portions. The light guide array may be used in displaying images that are generated by a light-emitting device. The light-emitting device may be formed from one or more light-emitting diodes, may include large predefined areas of light-emitting structures (e.g., for icons, alphanumeric characters, uniform areas of color, etc.) and/or may include an array of small pixels that form a general purpose display. Configurations in which the light-emitting device is formed from a display such as display 20 may sometimes be described herein as an example. The light guide array of device 18 may convey images that have been generated by display 20 to a user such as viewer 12 who is viewing device 18 in direction 14. Surface 24 may be associated with the outer surface of a light guide array. After being guided through the light guide elements of the light guide array, the light output from the light-emitting device (e.g., images from display 20) may appear on surface 24. Surface 24 may therefore sometimes be referred to as the outer surface or exit surface of the light guide array.

If desired, user input devices such as touch sensor 22 may be incorporated into light-based device 18. As an example, a touch sensor may be formed on surface 24 of light-based device 18 to gather touch input from an external object such as one or more fingers of a user (see, e.g., finger 16). The touch sensor may be a capacitive touch sensor having an array of transparent capacitive sensor electrodes such as indium tin oxide electrodes that gather capacitive touch sensor measurements. If desired, light-based device 18 may include touch sensors based on other types of touch technology (e.g., resistive touch, acoustic touch, light-based touch, force-based touch, etc.).

Control circuitry 24 may be used to generate images to display on display 20 or to control the light output of other light-emitting devices in device 18 and may be used in processing input from input-output devices in system 10 such as touch sensor 22. Control circuitry 24 may include storage and processing circuitry. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 24 may be used to process user input from sensor 22 and other input devices and to display images on display 20 and take other appropriate actions in system 10. The processing circuitry may be based on one or more microprocessors, microcontrollers, digital signal processors, baseband processors, power management units, audio chips, application specific integrated circuits, electronic control units, etc.

Figure 2:
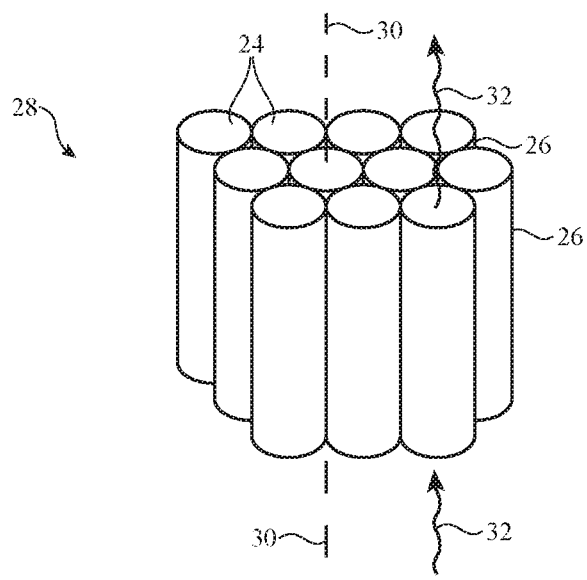
FIG. 2 is a perspective view of an illustrative light guide array having an array of elongated light guide elements such as a bundle of fibers in accordance with an embodiment.

A light guide array for device 18 may be formed from a bundle of elongated light guide elements. The light guide elements may be formed from transparent materials and may sometimes be referred to as fibers. As shown in FIG. 2, light guide array 28 may, for example, be formed from a set of fibers 26 each of which extends along a longitudinal axis such as axis 30. Fibers 26 may be formed from transparent materials such as plastic or glass. Fiber bundle structures such as light guide array 28 of FIG. 2 may sometimes be referred to as coherent fiber bundles or coherent light guide arrays. Light guide array 28 has a first surface (sometimes referred to as an entrance face) that receives light 32 (e.g., light from display 20 or other light-emitting device) and a corresponding second surface (sometimes referred to as an exit face) that emits light 32. Light 32 that is associated with an image on display 20 and that enters the entrance face of light guide array 28 (e.g., the exposed bottom surfaces of fibers 26 of FIG. 2) will be guided within fibers 26 to the exit face of light guide array 28 (i.e., upper surface 24 of light guide array 28 of FIG. 2) for viewing by viewer 12.

Figure 3:
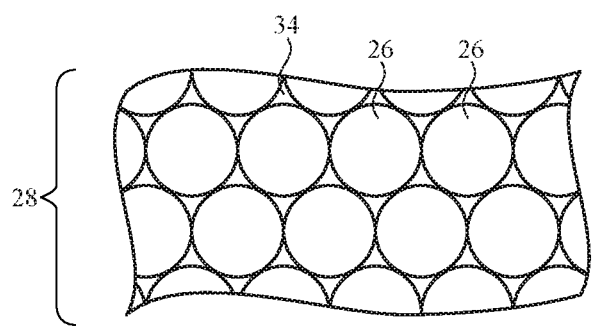
FIG. 3 is a cross-sectional view of an illustrative light guide array with circular fibers that serve as light guide elements in accordance with an embodiment.
Figure 4:
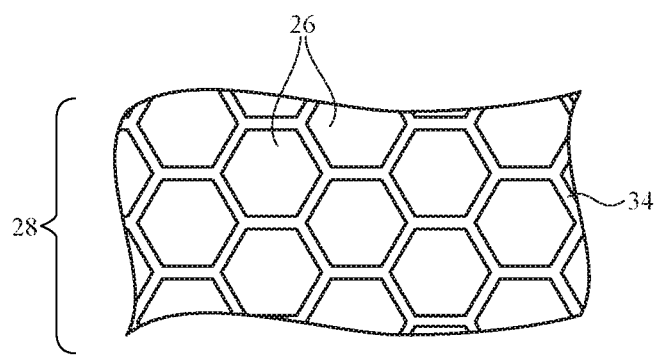
FIG. 4 is a cross-sectional view of an illustrative light guide array with hexagonal fibers that serve as light guide elements in accordance with an embodiment.

As shown in FIG. 3, fibers 26 may be embedded within cladding material 34. The index of refraction of cladding material 34 may be less than the index of refraction of fibers 26 so that fibers 26 can serve as light guide elements (e.g., so that fibers 26 may guide light 32 in accordance with the principle of total internal reflection). Cladding material 34 may, as an example, be formed from a clear polymer. Fibers 26 may have circular cross-sectional shapes as shown in FIGS. 2 and 3 or may have any other suitable shapes (see, e.g., the hexagonal shapes of fibers 26 of FIG. 4).

Figure 5:
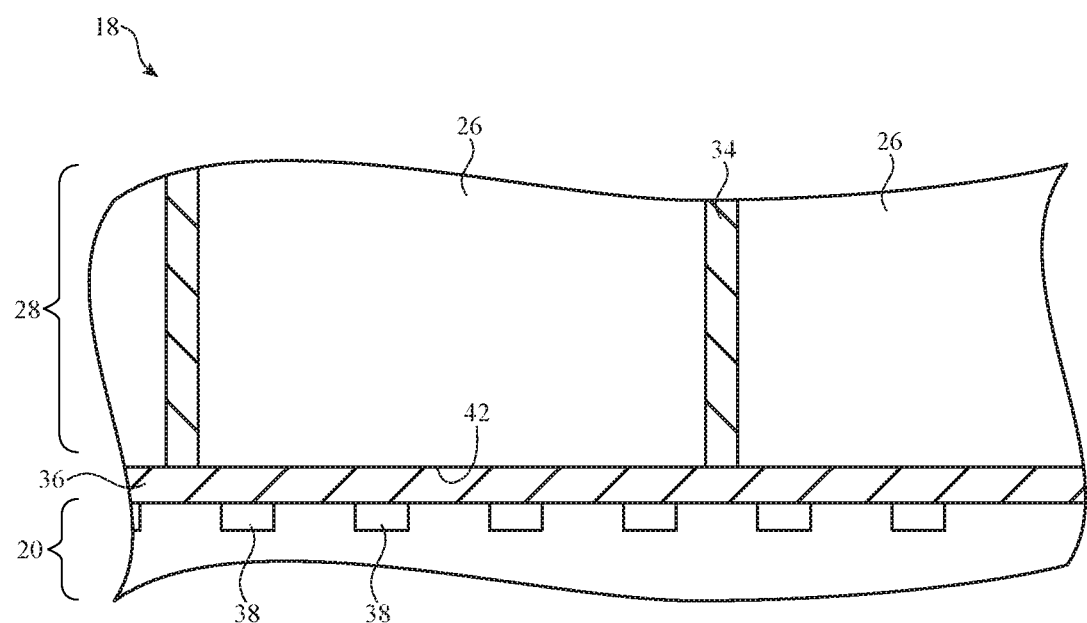
FIG. 5 is a cross-sectional side view of an illustrative pixel array in a display and an associated light guide array in accordance with an embodiment.

FIG. 5 is a cross-sectional side view of a portion of an illustrative light-based device. As shown in FIG. 5, light-based device 18 may have a light-emitting device such as display 20. Display 20 may have an array of pixels such as pixels 38 that emit light (e.g., light that forms images for a user of device 18). With the arrangement of FIG. 5, light guide array 28 has fibers 26 that each overlap multiple pixels 28. Arrangements in which a single light-emitting diode or other light-emitting structure emits light into multiple fibers 26 may also be used, if desired. Layer 36 of FIG. 5 may be used as an index-of-refraction matching layer to help reduce coupling losses when coupling light from pixels 38 into fibers 26. Layer 36 may also help attach display 20 to entrance face 42 of light guide array 28.

Figure 6:
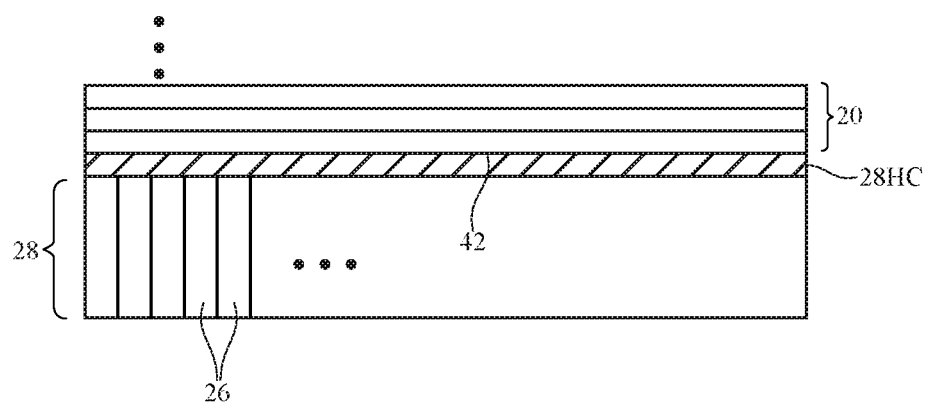
FIG. 6 is a cross-sectional side view of an illustrative light guide array having a surface on which display structures such as thin-film circuit structures have been formed in accordance with an embodiment.

If desired, display structures may be deposited and patterned on the surface of a light guide array. As shown in FIG. 6, for example, surface 42 of light guide array 28 (e.g., the entrance face of light guide array 28) may be polished and covered with a coating layer such as layer 28HC. Layer 28HC may be, for example, a layer of inorganic materials (e.g., silicon oxide, silicon nitride, etc.). Display 20 may be formed using low-temperature processing techniques and other display fabrication techniques to deposit and pattern display layers on layer 28HC (e.g., by depositing and patterning thin-film transistors, organic light-emitting diodes, and/or other thin-film transistor circuitry and light-emitting structures on layer 28HC).

Figure 7:
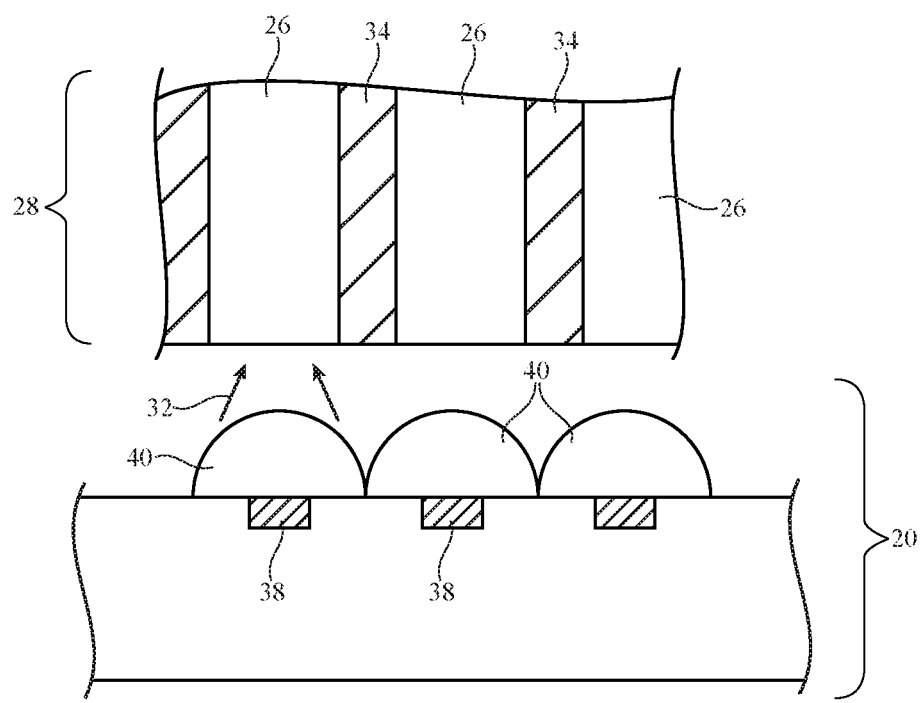
FIG. 7 is a cross-sectional side view of an illustrative array of pixels with microlenses that is being used to couple light into a light guide array in accordance with an embodiment.

FIG. 7 shows how optical structures such as lenses may be formed on a display to help couple light from the display into light guide array 28. As shown in FIG. 7, display 20 may include microlenses 40. Each microlens may cover one or more pixels 38 and may help direct light 32 that has been emitted from pixels 38 into respective fibers 26 in light guide array 28.

Figure 8:
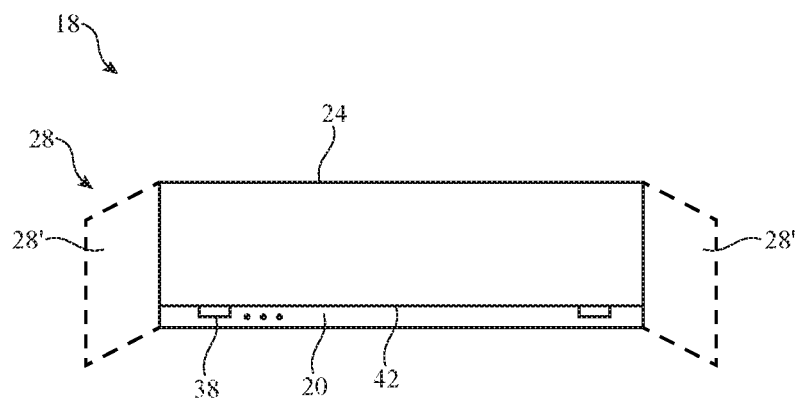
FIG. 8 is a cross-sectional side view of a light-based device based on a light guide array with a planar surface in accordance with an embodiment.

The array of light guide elements 26 in light guide array 28 effectively moves the location of the images generated by display 20 from the surface of display 20 (and the entrance surface of light guide array 28 adjacent to display 20) to exposed outer surface (exit surface) 24 of light guide array 28. Consider, as an example, the arrangement of FIG. 8. As shown in FIG. 8, pixels 38 of display 20 may be located adjacent to lower (inner) surface 42 of light guide array 28. When an image is displayed by pixels 38, the fibers in light guide array 28 translate the location of the image to outer surface 24. Surfaces 42 and 24 may be planar or may have other shapes. As shown in FIG. 8, for example, edge portions 28' of light guide array 28 may be curved (e.g., so that surface 24 curves along the edges of device 18).

Figure 9:
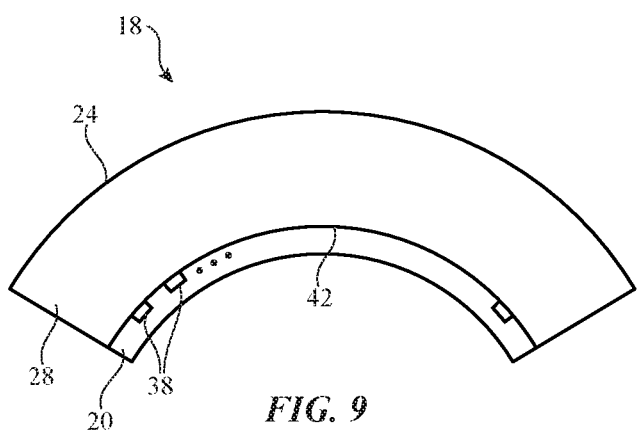
FIG. 9 is a cross-sectional side view of a light-based device based on a light guide array with a curved surface in accordance with an embodiment.

The example of FIG. 8 involves a translated image that is not magnified in size or reduced in size. In the illustrative configuration of FIG. 9, the curved shape of light guide structure 28 may magnify the image displayed on display 20 (i.e., the image on curved outer surface 24 of light guide array 28 may be magnified relative to the image on display 20). In configurations of the type shown in FIG. 9 in which inner light guide array surface 42 is curved, it may be desirable to form display 20 from a flexible display layer (e.g., a flexible organic light-emitting diode display, etc.).

Figure 10:
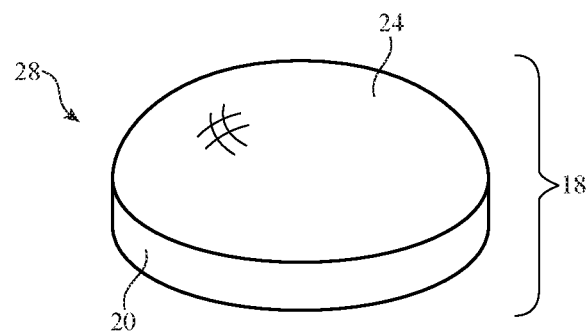
FIG. 10 is a cross-sectional side view of a light-based device based on a light guide array with a surface having compound curves such as a hemispherical surface in accordance with an embodiment.

If desired, outer surface 24 may have a compound curvature, as shown by illustrative hemispherical surface 24 of light guide array 28 of FIG. 10. Display 20 may, if desired, be planar or may be bent about a single axis, whereas outer surface 24 may, in general, be planar, may be bent about a single axis, or may exhibit a compound curvature as illustrated by illustrative surface 24 of FIG. 10.

Figure 11:
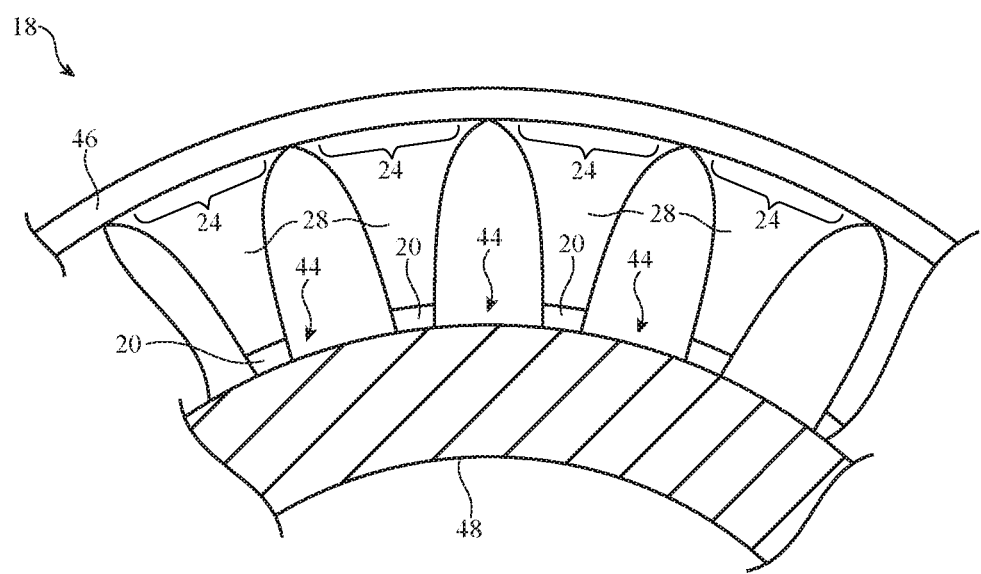
FIG. 11 is a cross-sectional side view of an illustrative arrangement in which a light-based device has been formed from a tiled array of displays and an array of associated flared light guide arrays in accordance with an embodiment.

Light-based device 18 may include an array of light guide arrays. As shown in FIG. 11, for example, each of multiple displays 20 in device 18 may be provided with a respective light guide array 28. The light guide arrays may have curved surfaces 24, planar surfaces, surfaces 24 with compound curvature, or other suitable surface shapes. In the example of FIG. 11, each light guide array 28 has a flared shape that allows upper surfaces 24 to merge and overlap gaps 44 between respective displays 20. In this way, displays 20 and light guide arrays 28 may be unified in a tiled fashion to form a single enlarged unitary display with an enlarged image area. Optional transparent display cover layer 46 may protect outer light guide surfaces 24 in the unitary display and may, if desired, include touch sensor structures (see, e.g., touch sensor 22).

Displays may be mounted on a support structure such as support structure 48. Support structure 48 may have a curved or planar surface with which displays 20 are supported. The arrangement of FIG. 11 may have a one-dimensional array of displays 20 and associated light guide arrays 28 or may have a two-dimensional array of displays 20 and associated light guide arrays 28 (e.g., a unitary display may be formed from either a one-dimensional or a two-dimensional tiled set of displays 20 whose display surfaces are each laterally expanded using the flared shape of light guide arrays 28 so as to hide inactive regions such as gaps 44 between displays 20 from view by a user).

Figure 12:
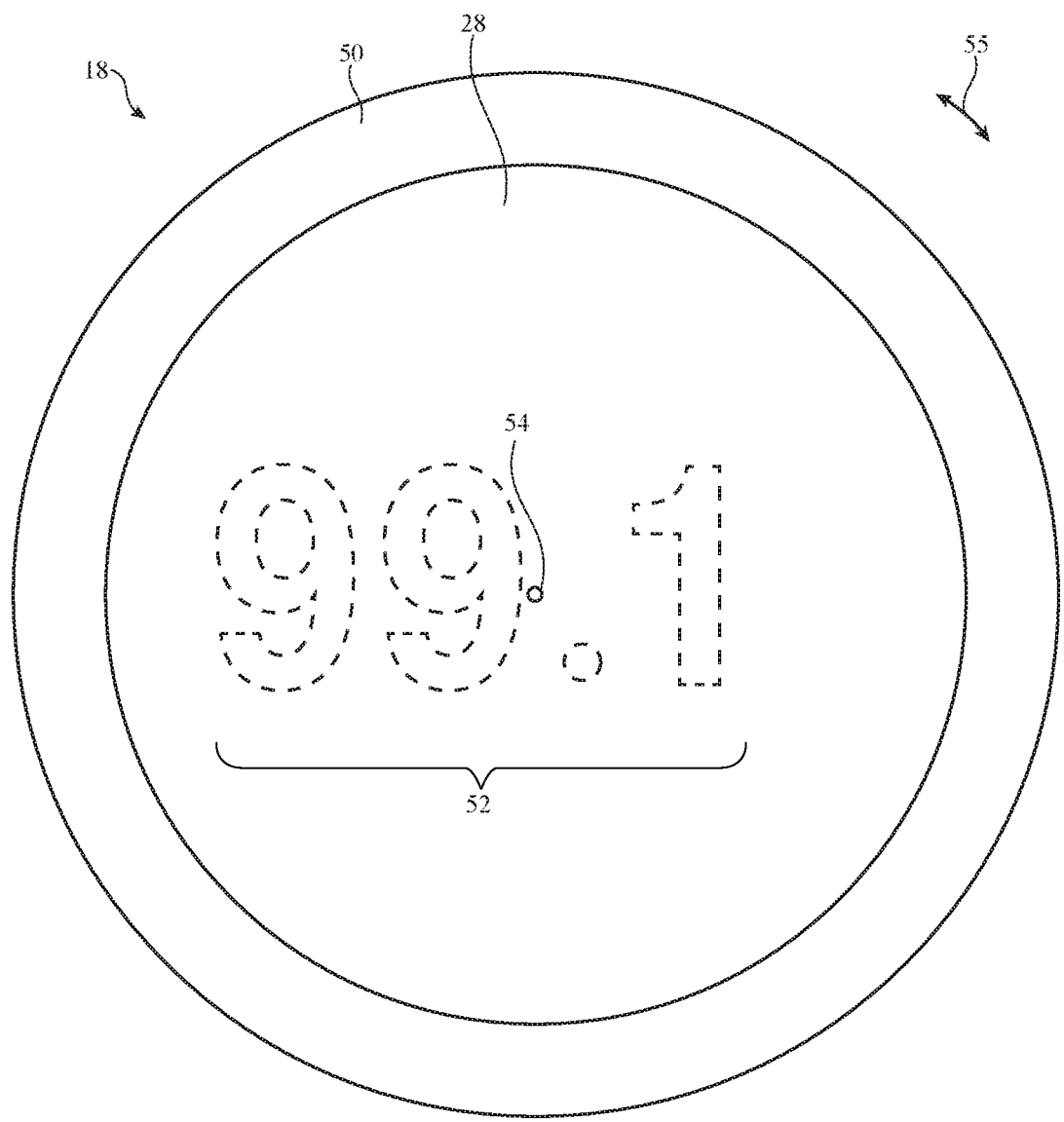
FIG. 12 is a front view of an illustrative control device such as a control knob that includes a light guide array in accordance with an embodiment.

If desired, light-based device 18 may include movable structures. An illustrative light-based device with a movable structure is shown in FIG. 12. As shown in FIG. 12, light-based device 18 may include a display mounted under a circular light guide array. Light guide array 28 may have a planar or curved surface. The display may produce an image. Due to the light guiding properties of light guide array 28, the image may be presented on the surface of light guide array 28, as illustrated by image 52. Image 52 may be used to present information on the status of system 10 or other information to the user of system 10. As an example, image 52 may contain information such as a current radio station identifier when device 18 is being used in a radio or other media system. In the example of FIG. 12, light-based device 18 has a rotating knob member such as ring 50. Ring 50 may be rotated about rotational axis 54 in directions 55 as light guide array 28 and therefore image 52 remains stationary.

Figure 13:
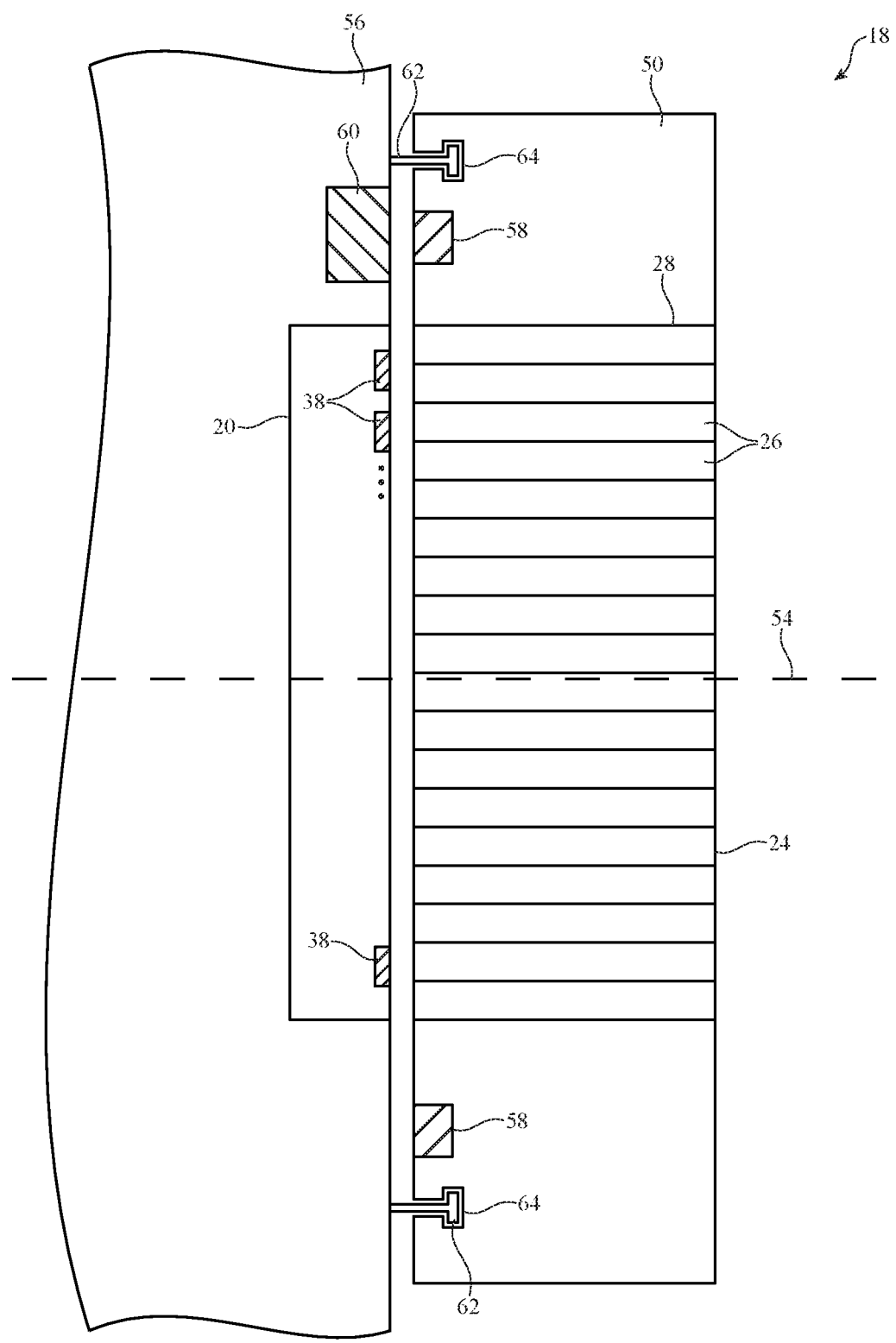
FIG. 13 is a cross-sectional side view of the illustrative control knob of FIG. 12 mounted to a supporting structure in accordance with an embodiment.

A cross-sectional side view of device 18 of FIG. 12 is shown in FIG. 13. As shown in FIG. 13, light-based device 18 (e.g., a rotating control such as a rotatable knob) may be mounted to structure 56 in system 10. Structure 56 may be part of a vehicle dashboard, may be part of a control panel surface in a computer or other electronic equipment, may be a part of a piece of furniture or a building wall, or may be any other suitable supporting structure. Coupling structure such as protrusions 62 and recesses 64 in ring 50 may be used to hold ring 50 and light guide array 28 in place on structure 56. Light guide array 28 may be held in place within ring 50. As ring 50 rotates about axis 54, light guide array 28 may rotate about axis 54 in directions 55. Nevertheless, because display 20 does not move with respect to structure 56, the image displayed on outer display surface 24 of light guide array 28 will remain stationary relative to display 20 and structure 56.

To monitor the rotational orientation of ring 50 about axis 54, ring 50 and structure 56 may be provided with a rotational encoder. The encoder may be used to provide control circuitry 24 with information on the position of ring 50. With one illustrative configuration, the encoder includes a ring of magnets 58 on ring 50 and a corresponding magnetic sensor such as sensor 60 in a fixed position on structure 56. Sensor 60 can be used by control circuitry 24 to monitor the rotation of ring 50 about axis 54. Other types of sensors (e.g., resistance sensors, etc.) for measuring the position of a controller such as ring 50 of FIG. 13 may be used, if desired. The use of a magnetic encoder is merely illustrative.

Figure 14:
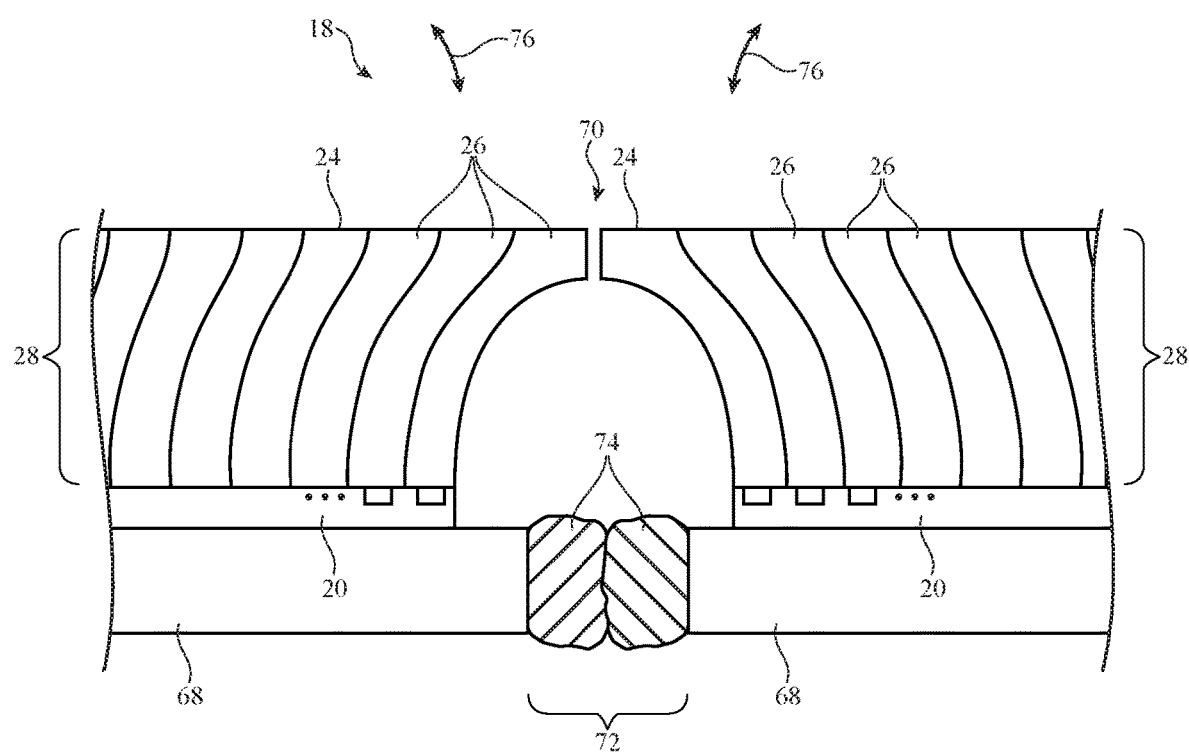
FIG. 14 is a cross-sectional side view of a portion of a system having mating structures such as vehicle body structures or other structures that move with respect to each other and that have corresponding displays with flared light guide arrays that overlap a gap between the mating structures in accordance with an embodiment.

Outwardly flared light guides 28 may be used to cover a seam between movable structures. As shown in FIG. 14, first and/or second structures such as structures 68 may move in directions such as directions 76. When in the position shown in FIG. 14, structure 68 are joined along seam 70. When at least one of structures 68 has been moved away from the other (e.g., by swinging on a hinge), structures 68 may separate along seam 70. Structures 68 may be, for example, parts of a door or other portion of the body of a vehicle and seam 70 may be a panel gap in the body. Elastomeric gaskets 74 may help seal structures 68 to each other. As shown in FIG. 14, light guide arrays 28 may have flared cross-sectional shapes that overlap gaskets 74, so that gaskets 74 are hidden from view while images are displayed on outer surfaces 24 of light guide arrays 28.

Figure 15:
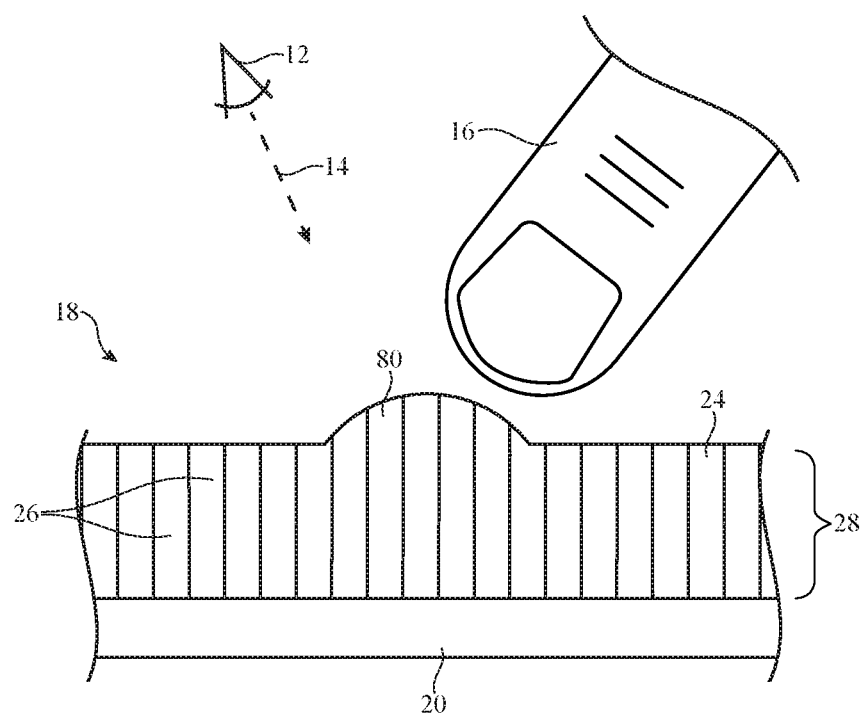
FIG. 15 is a cross-sectional side view of an illustrative display having a surface formed by a light guide array with a protrusion in accordance with an embodiment.

FIG. 15 is a cross-sectional side view of light-based device 18 in an illustrative configuration in which surface 24 of light guide array 28 has been provided with a non-planar feature such as feature 80. Feature 80 may include protruding portions (e.g., a ring-shaped ridge or other protrusion), recessed portions, or other portions that help catch a user's finger such as finger 16 as the user moves finger 16 across surface 24. This may help vision-impaired users and other users interact with device 18.

Figure 16:
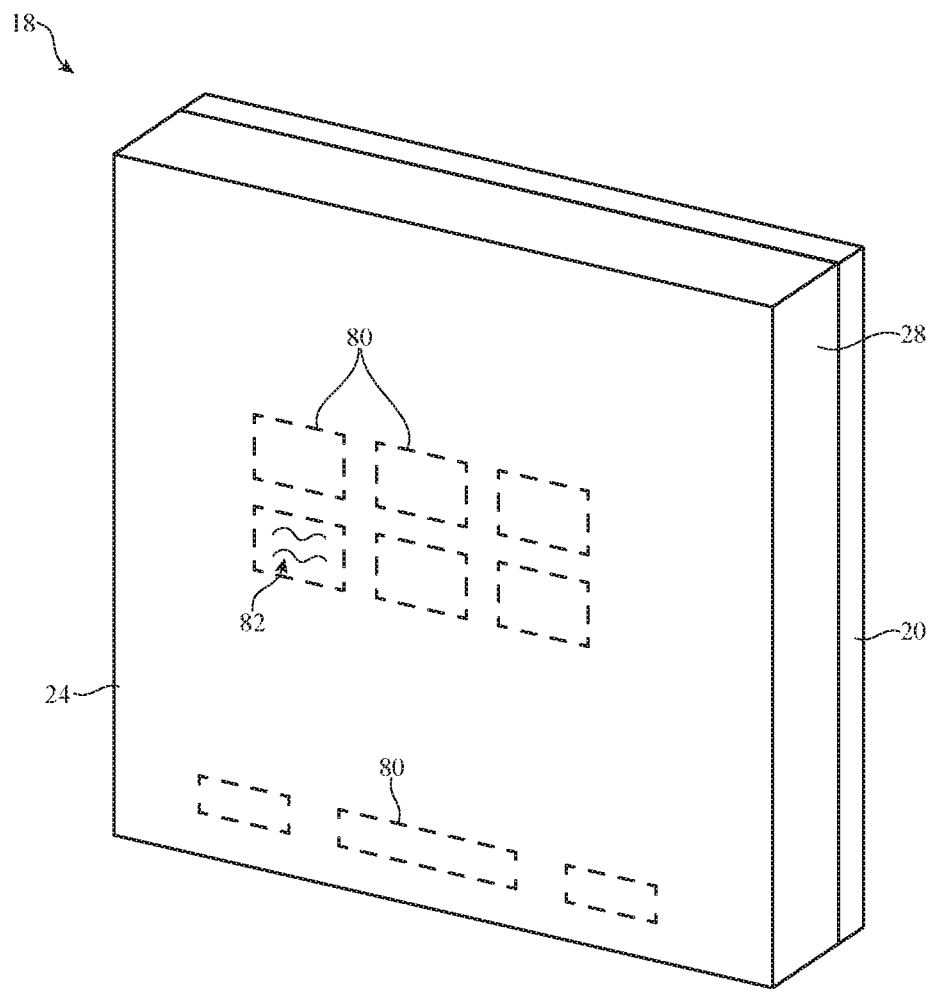
FIG. 16 is a perspective view of an illustrative display with non-planar features such as protrusions and recesses formed on the surface of a light guide array in accordance with an embodiment.

Display 20 may be used in displaying images on surface 24 that are aligned with non-planar features 80. A perspective view of an illustrative light-based device with arrays of non-planar features 80 is shown in FIG. 16. As shown in FIG. 16, features 80 may be formed in ring shapes and other shapes. These shapes may form the outline of virtual buttons (e.g., locations where on-screen selectable options are displayed). During operation, a selectable option such as illustrative convent 82 of FIG. 16 may be displayed in alignment with features 80 (e.g., in the middle of a ring-shaped protruding ridge that defines a virtual button location). Touch sensor structures in device 18 (e.g., capacitive touch sensor electrodes that overlap at least the virtual button locations within features 82) may be used to gather user touch input (e.g., button presses).

Figure 17:
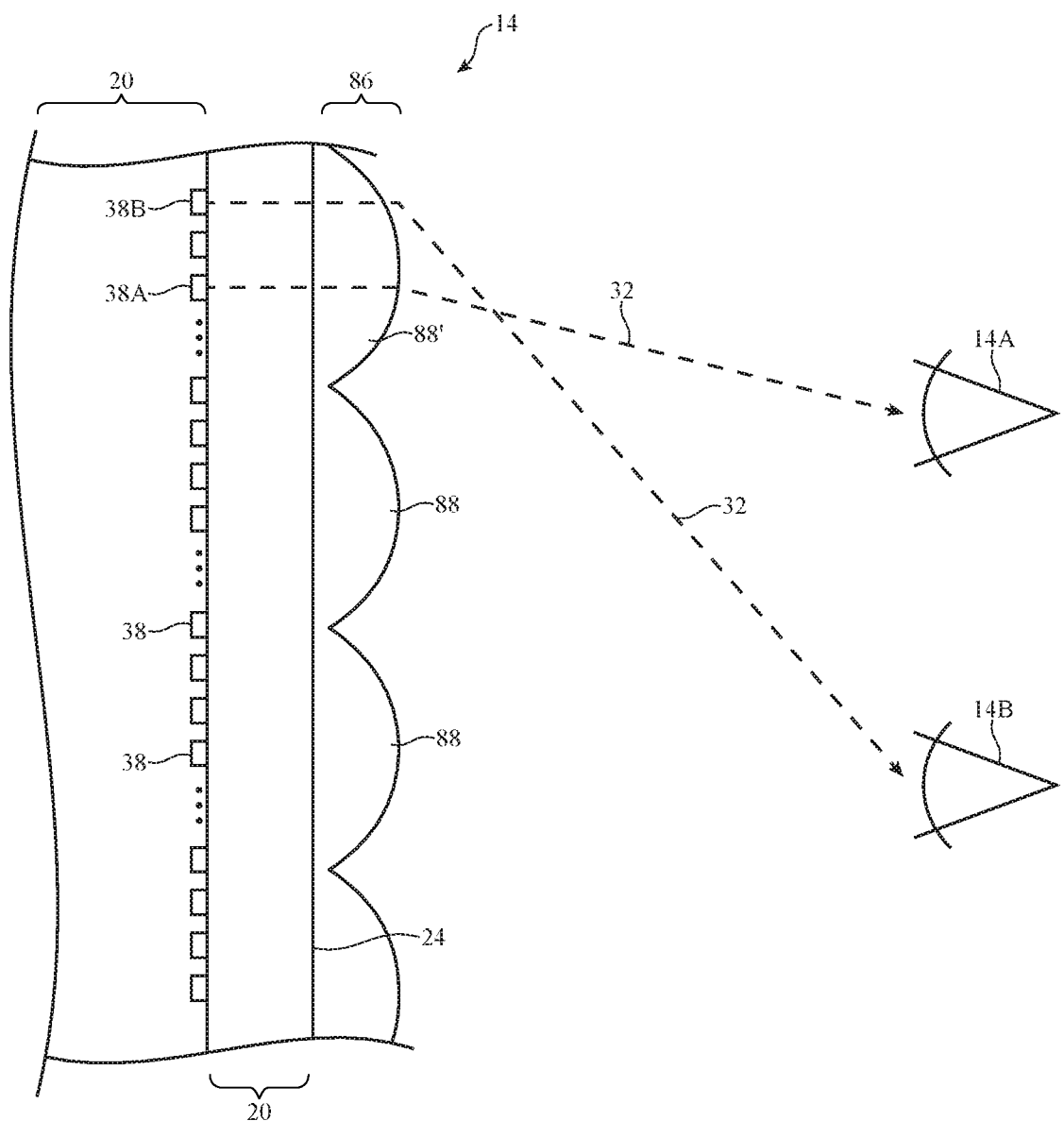
FIG. 17 is a cross-sectional side view of an illustrative light field display with a light guide array in accordance with an embodiment.

If desired, device 18 may be used to display three-dimensional images (e.g., device 18 may be a light-field display). A cross-sectional side view of an illustrative device of this type is shown in FIG. 17. As shown in FIG. 17, light guide array 28 may be used to convey light from an array of pixels 38 in display 20 to lower surface 84 of a layer of light redirecting structures such as lens array 86. Lens array 86 may include a plurality of lenses 88, each of which overlaps a respective set of pixels 38. Lenses 88 may be elongated lenticular lenses (i.e., lenses 88 may be parallel ridges extending across display 20) or lenses 88 may be circular lenses that are arranged in a two-dimensional array. The pixels associated with each lens 88 may be selectively controlled to provide output light that varies as a function of viewer position, thereby creating a three-dimensional image for the viewer. As an example, pixel 38A under lens 88' may be adjusted to adjust the intensity of light 32 that is viewed when the viewer is in location 14A and pixel 32B under lens 88' may be adjusted to adjust the intensity of light 32 that is viewed when the viewer is in location 14B. By interposing light guide array 28 between display 20 and lens array 86, surface 24 of light guide array 28 and therefore the outer surface of device 18 may be curved. As an example, surface 24 may have a compound curvature (e.g., device 18 may have the shape of a sphere, may have a hemispherical appearance, or may have other curved shapes).

Figure 18:
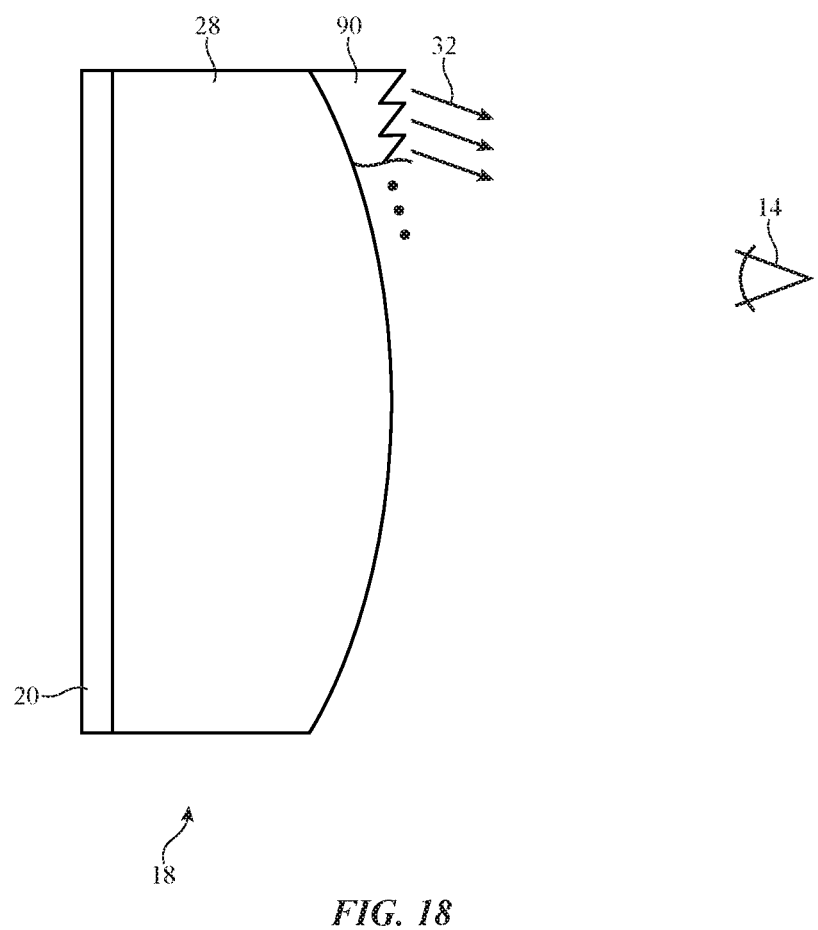
FIG. 18 is a cross-sectional side view of an illustrative light-based device having light redirecting structures on a curved light guide array surface in accordance with an embodiment.
Figure 19:
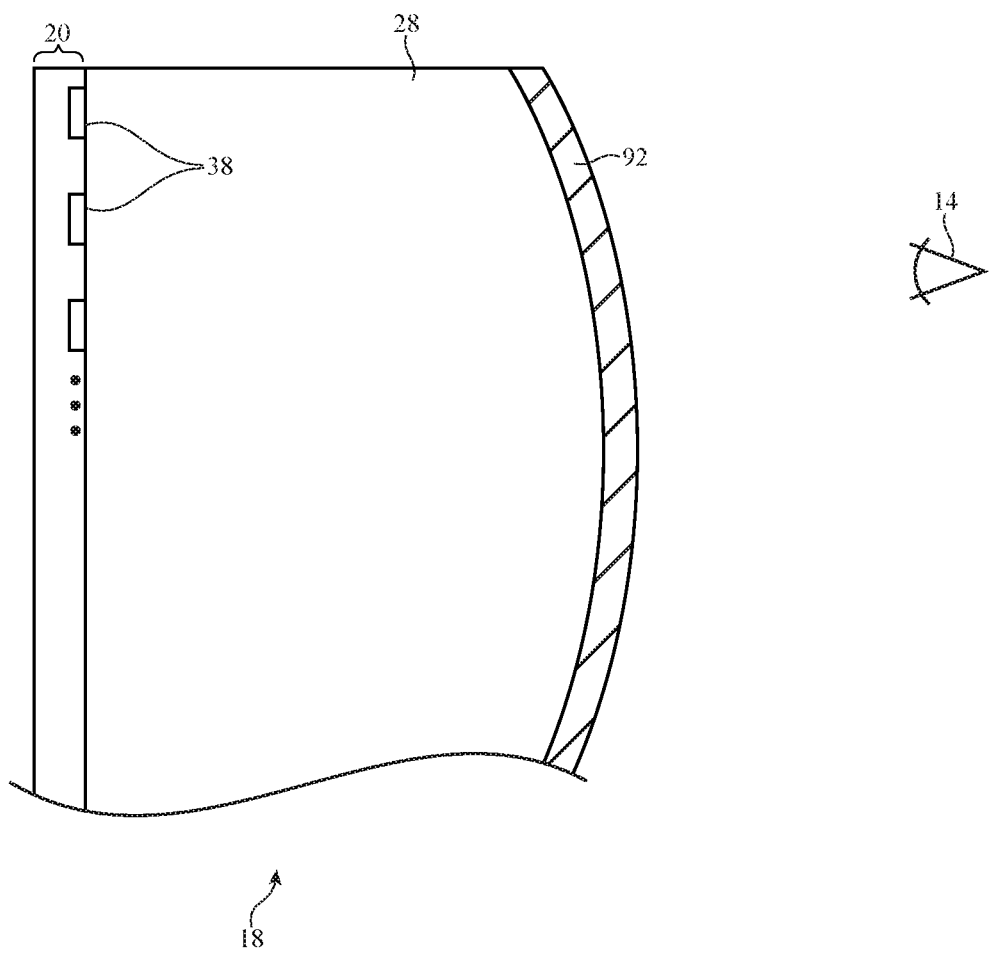
FIG. 19 is a cross-sectional side view of an illustrative light-based device having a layer of Fresnel lenses or other optical structures on a curved surface of a light guide array in accordance with an embodiment.

The cross-sectional side view of illustrative light-based device 18 of FIG. 18 shows how a prism array or other layer of light redirecting structures may be used to direct light 32 to viewer 14. This type of arrangement may be used, for example, to block a driver's view of a passenger's video content on a shared dashboard display while the viewer (e.g., the passenger) is able to view the content. The prisms or other structures of layer 90 may be formed by etching, molding, by photolithographic techniques, by embossing, by laser-processing or machining, or by using other suitable optical layer patterning techniques. If desired, lenses (e.g., Fresnel lenses) or other light-redirecting structures may be formed in this way (see, e.g., illustrative light redirecting layer 92 of FIG. 19, which may contain an array of Fresnel lenses). The lenses or other structures in layer 92 may be used change the apparent position of the image created by display 20.

Figure 20:
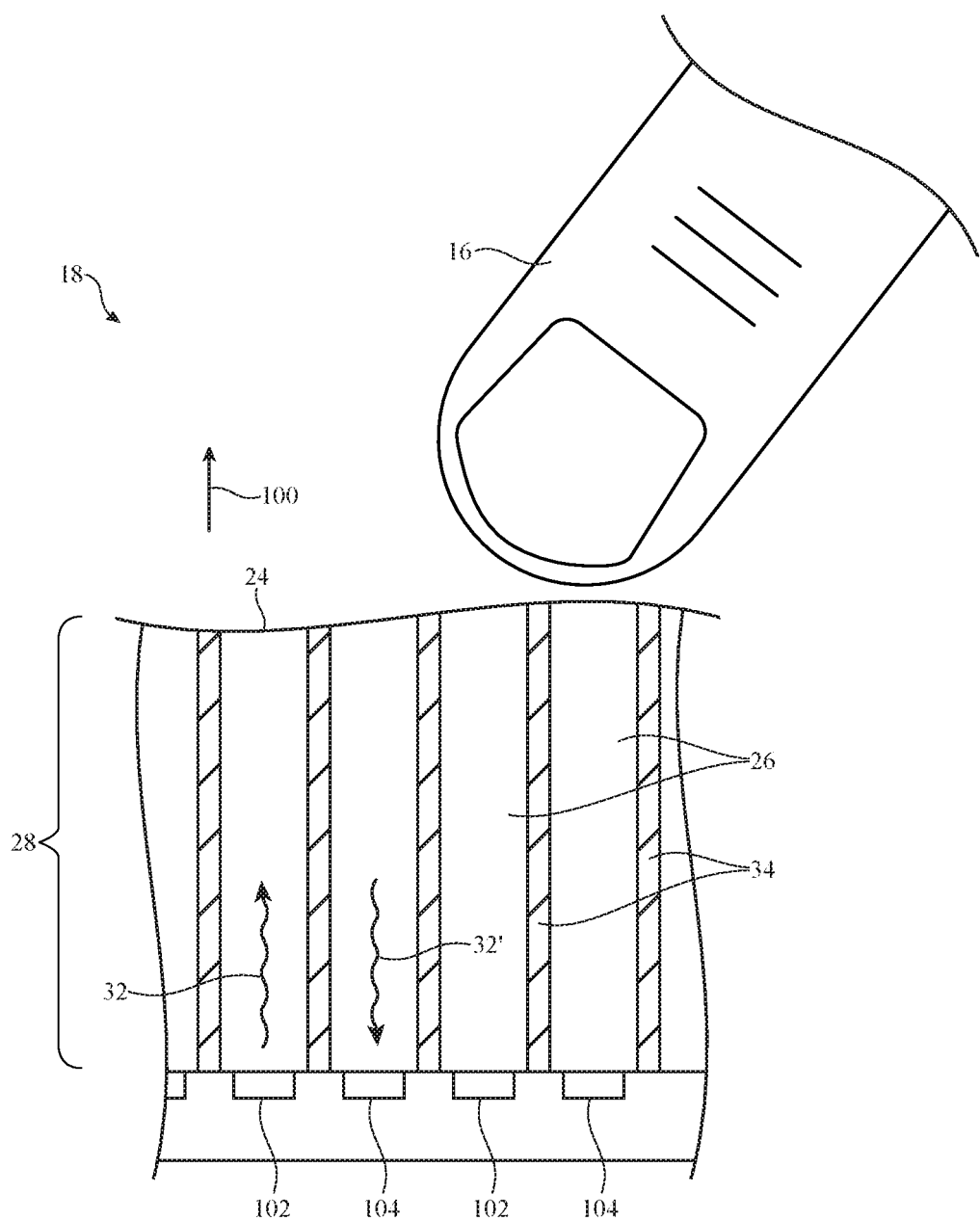
FIG. 20 is a cross-sectional side view of an illustrative light-based touch sensor formed from a light guide array in accordance with an embodiment.

If desired, light guide array 28 may be used informing a light-based touch sensor. As shown in FIG. 20, light 32 may be emitted through fibers 26 in upwards direction 100 from an array of light sources 102 (discrete or integrated on a common substrate) or from a single light source 102 that supplies light to multiple fibers 26. Light 32 that is emitted from the upper surface 24 of light guide array 28 (e.g., a planar or curved surface) may be reflected from finger 16 as reflected light 32' wherever finger 16 is present and may thereafter be conveyed by a corresponding adjacent fiber 26 in light guide array 28 to an associated light detector 104. Light detectors 104 may be discrete detectors or may be part of an array of detectors that is formed on a common substrate (as examples). By analyzing the intensities of the detected light at detectors 104, the position of finger 16 may be determined by control circuitry 24.

Figure 21:
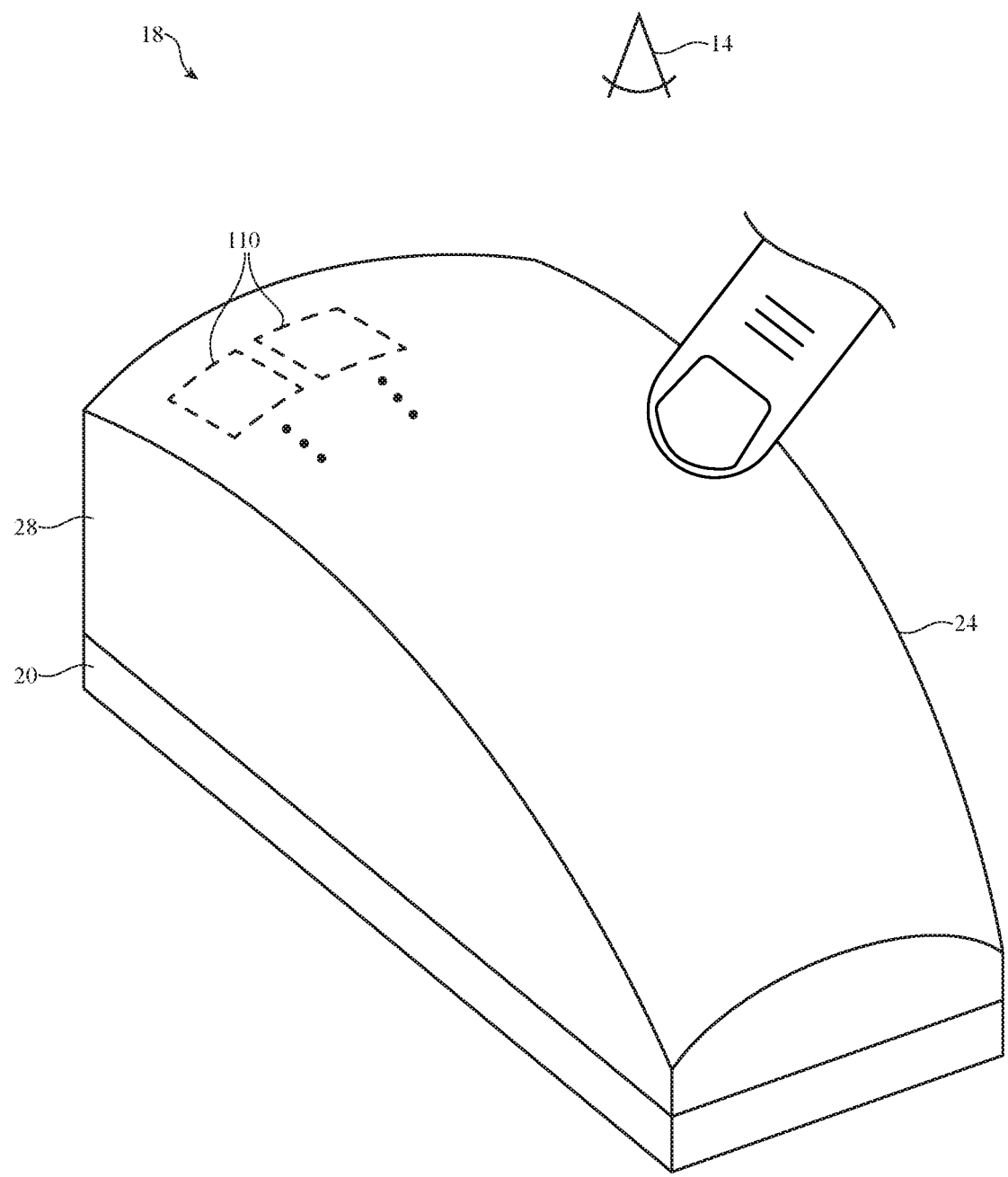
FIG. 21 is a perspective view of an illustrative light-based device formed from a light guide array with a curved surface overlapped by an array of touch sensor electrodes in accordance with an embodiment.

FIG. 21 is a perspective view of an illustrative light-based device with touch sensor electrodes such as touch sensor electrodes 110. Touch sensor electrodes 110 may be capacitive electrodes formed from indium tin oxide or other transparent conductive material for a capacitive touch sensor (e.g., touch sensor 22 of FIG. 1). Touch sensor electrodes 110 may be formed at locations that overlap outer surface 24 of light guide array 28 on display 20. Surface 24 may be curved (e.g., surface 24 may have compound curves). Light-based device 18 of FIG. 21 may be, for example, a computer mouse with a touch sensitive upper surface (surface 24) that has the ability to display images from display 20.

The light guide arrays may be fabricated from elastomeric materials such as silicones. This allows images to be displayed on the surface of a material that is deformable. This arrangement may be used to display images on the surface of an arm rest, while maintaining the surface as soft to the touch. An elastomeric wave guide would also allow for some degree of motion between display elements while maintaining the illusion of a continuous display. This could allow variable bending of a display, or display elements that could fold around an object.

Figure 22:
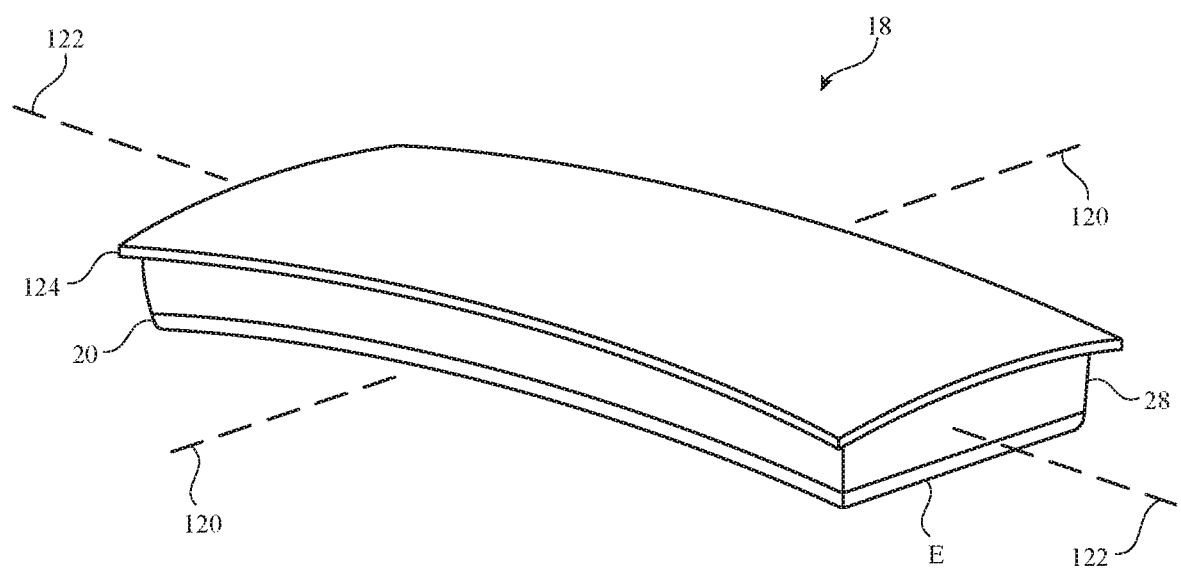
FIG. 22 is a perspective view of an illustrative light-based device having a light guide array with an exit surface of compound curvature and having a display layer that is bent about a bend axis in accordance with an embodiment.

As shown in FIG. 22, light-based device 18 may have a display such as display 20 that is bent about a first bend axis such as bend axis 120 and a light guide array such as light guide array 28 that is curved about axis 120 and is also curved about a second axis such as axis 122 to provide light guide array 28 and device 18 with an exterior surface that has compound curvature. Bend axis 120 may be oriented at a non-zero angle with respect to axis 122. For example, axes 120 and 122 may be orthogonal to each other. With this type of arrangement, the opposing right and left edges of display 20 (see, e.g., edge E of FIG. 22) are flat and the surface of display 20 is only bent about axis 120 and does not exhibit compound curvature, simplifying display fabrication. Bending display 20 about axis 120 helps reduce the thickness of light guide array 28 relative to a configuration in which display 20 is planar. As shown in FIG. 22, light guide array 28 may, if desired, be covered with one or more coatings, touch sensors, glass or plastic display cover layers, etc. (see, e.g., cover layer 124). If desired, cover layer 124 and/or other layers of the surface of array 28 may be omitted. Fibers 26 in light guide array 28 of FIG. 22 may be tapered or may not be tapered.

Figure 23:
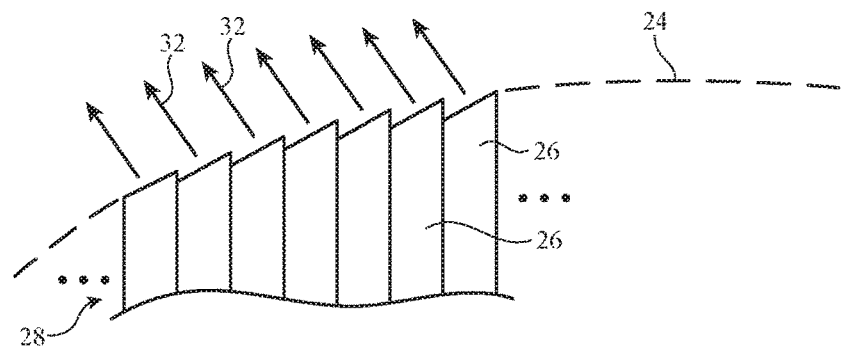
FIG. 23 is a cross-sectional side view of an illustrative light guide array in which fibers have faceted exit surfaces oriented in a common direction in accordance with an embodiment.

As shown in FIG. 23, fibers 26 or other light guide elements in light guide array 28 may have faceted surfaces (e.g., faceted surfaces formed by cleaving fibers 26 at an angle, etc.). The faceted surface of each fiber 26 in array 28 (or a subset of array 28) may be oriented in the same direction (i.e., the surface normal of each faceted exit surface may be oriented in the same direction), so that light 32 is emitted evenly (i.e., so that light 32 does not exhibit intensity variations due to different angles of emission from different fibers). Faceted fibers 26 may be used in light guide arrays with planar surfaces and/or in light guide arrays such as array 28 of FIG. 23 that have curved surfaces such as surface 24.

Figure 24:
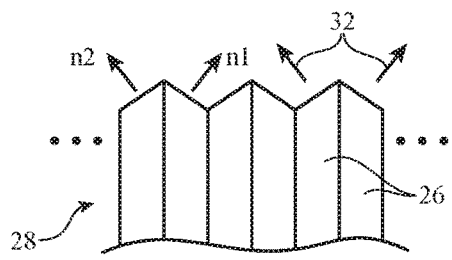
FIG. 24 is a cross-sectional side view of an illustrative light guide array in which alternating fibers in the array have faceted surfaces oriented in different respective directions in accordance with an embodiment.

In general, light guide elements such as fibers 26 may have faceted exit surfaces (and associated surface normals) that are aligned along one or more one directions. FIG. 24 shows how alternating fibers or other distinct sets of fibers 26 in array 28 may be provided with facets having surface normals n1 and n2 that are oriented in different respective directions (e.g., to provide a viewer with different images in the viewer's right and left eyes to support three-dimensional display technologies, to provide first and second users or first and second viewpoints for a single user with different images, etc.).

Figure 25:
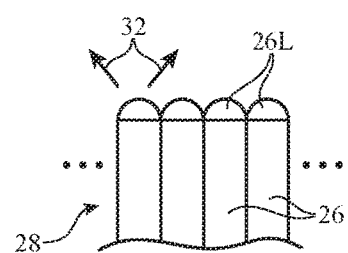
FIG. 25 is a cross-sectional side view of an illustrative light guide array in which fibers have convex lenses in accordance with an embodiment.

As shown in FIG. 25, each fiber 26 in array 28 may be provided with an associated lens 26L. Lenses 26L may be formed, for example, be depositing a liquid polymer precursor material on the surface of fibers 26 so that surface tension forms convex lens shapes for lenses 26L. The liquid polymer material can be cured by application of ultraviolet light, heat, etc., to form lenses 26L. Convex lenses of the type shown in FIG. 25 may be used to help spread light 32 over an enhanced range of emission angles. If desired, lenses 26L may be formed by polishing the tips of fibers 26, by melting the tips of fibers 26 and allowing molten tip material to resolidify, or using other lens formation techniques.

Figure 26:
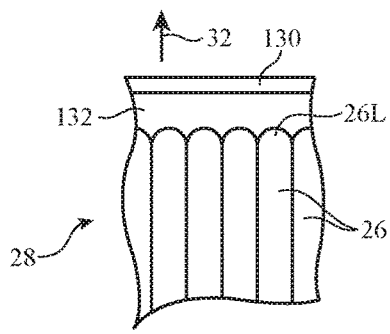
FIG. 26 is a cross-sectional side view of an illustrative system in which a covering layer and a cavity that can be filled with fluid overlap an array of fibers with lenses in accordance with an embodiment.

FIG. 26 shows how an array of fibers 26 with lenses 26L may be incorporated into a system that has a covering layer such as layer 130 that is separated from lenses 26L by a cavity such as cavity 132. A pumping system may be used to place different fluids in cavity 132 (e.g., air, water, oil, a liquid with an index of refraction that matches the refractive index of fiber 26 and of layer 130, etc.). The pumping system may be used to adjust the contents of cavity 132 in real time. For example, if it is desired for array 28 to emit light 32 over a wider range of angles, air or other gas with an index of refraction that is less than that of lenses 26L and layer 130 may be placed in cavity 132. In this state, lenses 26L will help spread light 32 as light 32 is emitted by each fiber 26. If it is desired for array 28 to emit light 32 over a smaller range of angles, index-matching liquid may be placed in cavity 132. The index-matching liquid defeats the ability of lenses 26L to refract light 32, so that light 32 will be emitted over a narrower range of angles. This type of arrangement may, if desired, be used to provide a display with an adjustable privacy feature. When privacy is not desired, cavity 132 may be filled with gas. When privacy is desired, cavity 132 may be filled with index-matching liquid to narrow the angle-of-view of the display.

Figure 27:
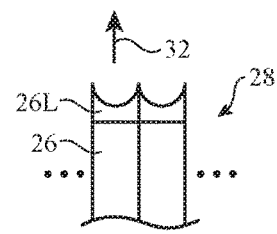
FIG. 27 is a cross-sectional side view of an illustrative light guide array having fibers with concave lenses in accordance with an embodiment.

FIG. 27 shows how lenses 26L may be concave lenses to help narrow the angular spread of the light (light 32) emitted by each fiber 26 in array 28.

Figure 28:
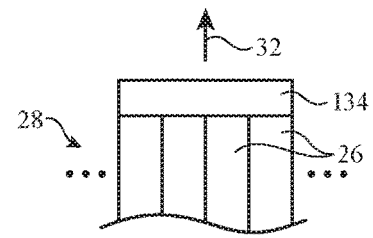
FIG. 28 is a cross-sectional side view of an illustrative light guide array covered with a coating such as an antireflection coating in accordance with an embodiment.

As shown in FIG. 28, a coating layer such as coating 134 may be formed over the surface of fibers 26 in array 28. Coating 134 may include one or more layers such as an antireflection layer, an oleophobic layer, an antiscratch layer, etc.

Figure 29:
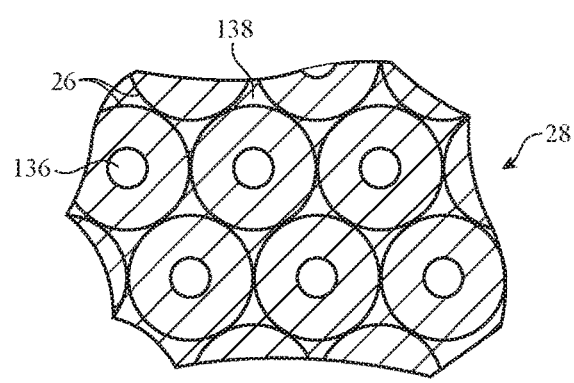
FIG. 29 is a top view of an illustrative light guide array with an overlapping opaque covering layer having openings aligned with respective light guide elements in the array in accordance with an embodiment.

FIG. 29 is a top view of array 28 in an illustrative configuration in which array 28 has been covered with a covering layer. Covering layer 138 may be formed from a material such as metal, leather, wood, plastic, ink, a fiber-composite material such as a carbon-fiber composite, glass, etc. For example, covering layer 138 may be formed from an opaque material (black ink, opaque metal, leather, wood, opaque plastic, opaque fiber-composite material, opaque glass, etc.). Openings 136 may be aligned with respective fibers 26 to allow light to pass through layer 138. Fibers 26 may have high index of refraction cores surrounded by low index of refraction claddings to help concentrate light 32 under openings 136 or fibers 26 may be formed from glass, plastic or other material with only a single index of refraction.

Figure 30:
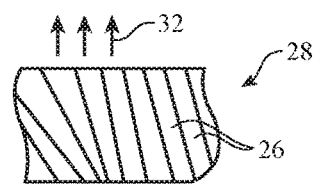
FIG. 30 is a cross-sectional side view of a light guide array having light guide elements formed from fibers in a layer of treated wood in accordance with an embodiment.

Wood may be treated to form a light guide array, as illustrated in FIG. 30. In the example of FIG. 30, light-guide array 28 has transparent wood fibers 26 that guide light 32. Wood fibers 26 may be rendered transparent by treating a piece of wood in a chemical bath (e.g., by bleaching a wood layer in a heated sodium hydroxide bath or other bleaching agent). The bleaching process may remove materials in the wood such as lignin that might otherwise absorb light 32.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   a light-emitting device, wherein the light-emitting device comprises a display having an array of pixels and wherein the display is bent about a bend axis; and
   a light guide array having an array of light guide elements, wherein the light guide array has an entrance surface configured to receive light from the light-emitting device and has an exit surface with a compound curvature, wherein the entrance surface has a curvature that is different from the compound curvature of the exit surface, and wherein the light guide elements are configured to convey light received from the light-emitting device at the entrance surface to the exit surface.

2. The apparatus defined in claim 1 wherein the display comprises an organic light-emitting diode display and wherein the light guide array is formed from a plurality of fibers.

3. The apparatus defined in claim 1 wherein the light guide array is formed from a bundle of fibers.

4. The apparatus defined in claim 3 wherein the fibers have faceted exit surfaces and wherein at least some of the faceted exit surfaces have surface normals that are oriented in a common direction.

5. The apparatus defined in claim 3 further comprising a lens array that overlaps the exit surface so that the display, light-guide array, and lens array form a light-field display that displays three-dimensional images.

6. The apparatus defined in claim 3 wherein the display is configured to present an image to the entrance surface and wherein the light-guide array has a flared cross-sectional shape so that the exit surface displays in image that is magnified relative to the image presented to the entrance surface.

7. The apparatus defined in claim 3 further comprising an inorganic coating layer on the entrance surface, wherein the display is formed on the inorganic coating layer.

8. The apparatus defined in claim 3 further comprising lenses interposed between the entrance surface and the display.

9. The apparatus defined in claim 3 wherein the fibers have tips at the exit surface with respective lenses.

10. The apparatus defined in claim 1 further comprising a touch sensor that overlaps the light guide array, wherein the exit surface has protruding features.

11. The apparatus defined in claim 8 wherein the light guide array is configured to rotate relative to the display.

12. The apparatus defined in claim 11 wherein the protruding features have ring shapes that surround virtual button locations on the exit surface.

13. The apparatus defined in claim 1 further comprising a rotatable structure in which the light guide array is mounted.

14. The apparatus defined in claim 13 further comprising a support, wherein the rotatable structure is coupled to the support and is configured to rotate about a rotational axis relative to the support and wherein the light-emitting device is stationary with respect to the support.

15. The apparatus defined in claim 1 wherein the light guide elements comprise plastic and wherein the light guide elements have a first index of refraction, the apparatus further comprising cladding material that surrounds the light guide elements and that has a second index of refraction that is less than the first index of refraction.

16. The apparatus defined in claim 1 wherein the light guide array is formed from a bundle of treated transparent wood fibers.

17. Apparatus, comprising:
    a first light-emitting device;
    a first light guide array formed from a first bundle of fibers, wherein the first light guide array overlaps the first light-emitting device;
    a second light-emitting device;
    a second light guide array formed from a second bundle of fibers, wherein the second light guide array overlaps the second light-emitting device;
    a first structure to which the first light-emitting device is mounted; and
    a second structure to which the second light-emitting device is mounted, wherein the second structure and the second light-emitting device move relative to the first structure and the first light-emitting device, wherein the first structure and the second structure are separated by a seam, and wherein the first light guide array and the second light guide array cover the seam.

18. The apparatus defined in claim 17 wherein the first and second structures comprise portions of a vehicle body.

19. A device having an outer surface, wherein the device gathers touch input from a finger of a user at a location on the outer surface, comprising:
    a light guide array having an input surface and an output surface, wherein the light guide array is formed from a bundle of elongated light guide elements including at least first and second elongated light guide elements each having a first end at the input surface and a second end at the output surface;
    at least one light source that emits light into the first end of the first elongated light guide element, wherein the first elongated light guide element guides the light to the location; and
    a light detector that receives reflected light from the first end of the second elongated light guide element, wherein the second elongated light guide element guides the light from the location to the detector, wherein the second elongated light guide element is interposed between the light detector and the outer surface.

* * * * *